Nov. 16, 1948.　　　　F. M. BLEY　　　　2,454,125
CUTOFF WHEEL
Filed March 2, 1946
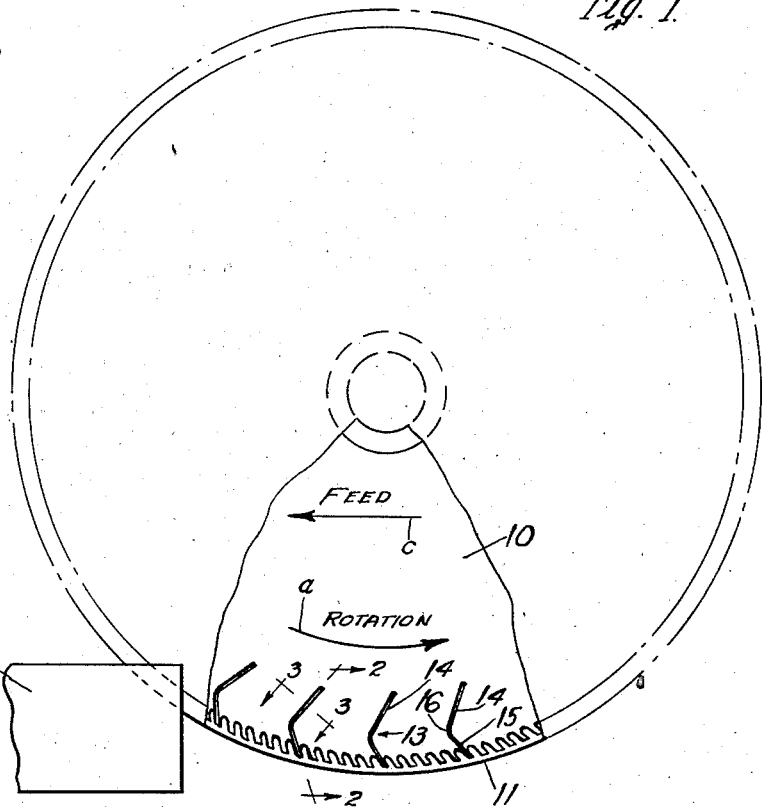
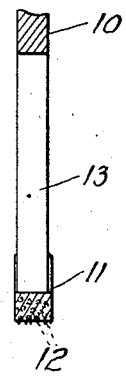
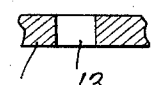
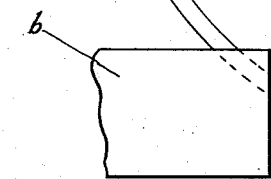
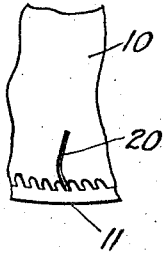
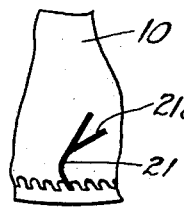
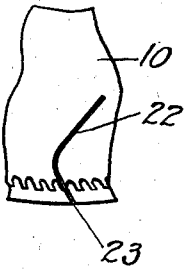
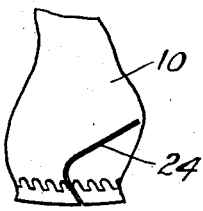
Inventor.
Fred M. Bley.
By Brown, Jackson, Boettcher & Dienner.
Attys.

Patented Nov. 16, 1948

2,454,125

UNITED STATES PATENT OFFICE 2,454,125

CUTOFF WHEEL

Fred M. Bley, Glenview, Ill.

Application March 2, 1946, Serial No. 651,579

7 Claims. (Cl. 51—206)

This invention relates to cut-off saws or wheels, and has to do with means for supplying a suitable liquid to the cutting edge of the wheel and the kerf made thereby, during the cutting operation.

Cut-off wheels or saws are extensively used for cutting a great variety of materials, many of which are quite hard. Such wheels are provided with peripheral cutting surfaces, comprising cutting elements suitably associated with the disc or body of the wheel. The wheel itself may be formed of an abrasive material and a suitable binder, whereby it has a peripheral abrasive cutting edge, or, particularly, if exceptionally hard materials are to be cut, the wheel disc may be formed of a suitable metal and have diamond particles set or embedded in its periphery providing a peripheral cutting edge.

In use, cut-off wheels of the character referred to are driven at high peripheral speed while in pressure contact with the material being cut, so that considerable heat is generated at the peripheral area of the saw or wheel. Unless the wheel is effectively cooled and the fines are removed from the kerf as rapidly as produced, the wheel soon becomes overheated and its cutting edge is clogged or dulled, materially reducing the rate of cutting and shortening the life of the wheel, and, in certain cases, creating the risk of cracking of the material being cut, due to the high heat generated.

It is common practice, in the use of cut-off saws or wheels, to flow a liquid coolant and lubricant, such as water, a mixture of water and a water soluble oil, or oil or an oil mixture, onto the sides of the wheel with the object of having such liquid enter the kerf and cool the peripheral area of the wheel. In practice, most of the liquid so applied to the wheel is rapidly discharged therefrom by centrifugal force and the wind or air resistance created by the high speed rotation of the wheel. But little of the liquid enters the kerf, and practically none of the liquid reaches the area of contact between the cutting edge of the wheel and the bottom of the kerf, where it is most needed. Due to lack of adequate cooling, flushing and lubrication at the area where most needed, the fines are not removed as rapidly as produced, objectionable heating and dulling of the cutting edge of the wheel occurs, the rate of cutting is slowed down, and the cut-off wheel can not be operated at its maximum possible efficiency.

My invention is directed to the provision of a cut-off wheel having means whereby adequate supply of a liquid coolant and lubricant to the wheel and the kerf cut thereby, particularly at the area of contact between the peripheral cutting edge of the wheel and the bottom of the kerf, is assured. To that end, I provide the disc of the wheel with slots therethrough so formed and disposed that the liquid coolant flowed onto the sides of the wheel enters such slots, and is retained therein and flows therealong to the periphery of the wheel, where it is delivered between the cutting edge thereof and the bottom of the kerf in contact with such cutting edge. That assures adequate cooling of the wheel and of the material being cut, as well as rapid removal of the fines as produced, thereby avoiding objectionable heating and dulling of the cutting edge of the wheel, so that the wheel operates at maximum efficiency with corresponding increase in the rate of cutting and the smoothness and accuracy of the cut made, and increased length of life of the wheel. Further objects and advantages of my invention will appear from the detail description.

In the drawings:

Figure 1 is a side view of a cut-off wheel embodying my invention, the wheel being shown fragmentarily and indicated in major portion in dot and dash lines;

Figure 2 is a sectional view, on an enlarged scale, taken substantially on line 2—2 of Figure 1;

Figure 3 is a sectional view, on an enlarged scale, taken substantially on line 3—3 of Figure 1; and Figures 4, 5, 6 and 7 are fragmentary side views of cut-off wheels embodying my invention, showing some of the possible variations in form and arrangement of the coolant receiving slots.

My invention is particularly applicable, in certain of its aspects, to diamond cut-off saws or wheels having peripheral cutting edges the cutting elements of which are provided by diamonds, or diamond particles, appropriately mounted or set therein, providing in effect a cutting edge impregnated with diamonds or diamond particles. I shall, therefore, disclose my invention as embodied in a diamond cut-off wheel, by way of example, it being understood, however, that in its broader aspects my invention is applicable to cut-off saws or wheels of various types.

I have shown, in Figures 1 to 3, inclusive, a diamond cut-off wheel comprising a disc 10 having a somewhat thickened rim 11 in which are mounted diamond particles 12 providing a peripheral cutting edge for the disc 10. This disc 10 may be formed of suitable metal, steel or copper, for example, and the diamond particles 12 are mounted in rim 11 in a known manner. The cut-off wheel so far described is of known construction. In use, wheels of this type, suitably mounted, are rotated at high speed in edgewise pressure contact with the material being cut, the latter and the wheel having relative movement for effecting the desired cut. In using a wheel of this type in which the disc 10 is continuous, it is difficult to introduce a liquid coolant and lubricant into the cut or kerf made by the wheel, and the latter is not used to its maximum possible efficiency, as and for the reasons above pointed out.

I have discovered that by providing disc 10 with properly disposed and formed slots it is possible to introduce the liquid coolant and lubricant in adequate amount into the kerf, particularly at the area thereof in contact with the cutting edge of the wheel, thereby assuring rapid flushing out of the fines produced by the cutting operation, as well as effective cooling and lubrication of the wheel and of the material being cut. That renders possible increased speed of rotation of the cutting wheel without risk of overheating or dulling thereof, so that the wheel may be used at its maximum possible efficiency with resultant increased speed and accuracy in the cutting operation. In accordance with my invention, I provide the disc 10 with a plurality of suitably spaced slots 13 in its radially outer portion, these slots extending completely through disc 10 and extending outward thereof with their outer ends adjacent the cutting edge of the disc. Each of the slots 13 comprises an inner portion 14 inclined across the axis of disc 10, and an outer portion 15 extending from and inclined oppositely to the inner portion 14, these two portions of the slot being connected by an arcuate portion 16. The outer portions 15 of the respective slots terminate in rim 11 at a point closely adjacent the cutting edge of the disc. In using the cutting wheel, it is rotated in the direction indicated by the arrow $a$, with its cutting edge in pressure contact with the material being cut, which material may be assumed to be a block of quartz $b$. The cutting wheel is moved toward the block $b$, as indicated by the arrow $c$ and, during the cutting operation, is maintained in suitable pressure contact therewith. Obviously, the block $b$ may be advanced toward the cutting wheel, or the two may be moved toward each other, as will be understood, it sufficing that the relative movement is such that the cutting wheel makes the desired cut in or through the block.

During the cutting operation fines are produced and these fines should be removed as rapidly as produced, to assure most efficient operation of the cutting wheel. During the cutting operation a liquid coolant and lubricant is flowed onto the side faces of the cutting wheel in a known manner, this liquid travelling outward along the side surfaces of the wheel due to centrifugal force. As the liquid moves outward it enters the inner portions 14 of the slots 13, in which slots it is retained so as to be shielded thereby from the air resistance or wind produced by the high speed rotation of the wheel. It will be noted that the inner portions 14 of the slots 13 are inclined outward away from the direction of rotation of the wheel, whereas the outer portions 15 of such slots are inclined outward toward the direction of such rotation. Further, the walls of the respective slots at the following sides thereof is normal to the plane of disc 10, providing a backing surface for liquid retained in the slots effectively preventing displacement therefrom of such liquid. Conveniently, the leading wall of the respective slots 13 also is perpendicular to the plane of disc 10. The liquid in the inner portion 14 of the respective slots 13 is urged outward thereof by centrifugal force and by the liquid entering the slots from the side faces of the disc. The liquid in the outer portion 15 of the respective slots 13 also is urged outward by centrifugal force but, due to the inclination of portion 15, this outward flow of the liquid is retarded to a certain extent. That assures that the slots 13 are maintained full of water or other coolant liquid, continuously supplied to the inner ends of the slots by the liquid coolant moving outward along the sides of the disc 10, the liquid being continuously delivered from the slots 13 at points closely adjacent the cutting edge of the wheel. The liquid coolant is thus directed into the cut or kerf made in block $b$, particularly at the area of contact between the bottom of the kerf and the cutting edge of the wheel, assuring thorough flushing of the kerf and removal therefrom of the fines as produced, while also effectively cooling and lubricating the peripheral portion of the wheel and the kerf area of the material being cut.

I find that the form and arrangement of the coolant and lubrication liquid receiving slots may be varied considerably depending upon the material to be cut. In Figure 4 I have shown a slot 20 of different form lengthwise than the slots 13 of Figure 1, slot 20 being disposed more nearly radially of disc 10, but with its inner and outer portions oppositely inclined across the axis of the disc and connected by an elbow or curve of substantial radius. In Figure 5 the disc 10 is provided with a slot 21 which is generally similar to the slots 13 of Figure 1, except that it is provided with a supplemental arm 21a opening into slot 21 a short distance above the curve or elbow thereof. In Figure 6, the inner and outer portions of slot 22 are disposed at somewhat different inclinations than the inner and outer portions of the slots 13 of Figure 1. A further distinction of the slot 22 is that it opens at its outer end, at 23, through the cutting edge of the wheel. In a wheel provided with slots 22, the liquid coolant and lubricant is delivered directly to the bottom of the kerf, which is advantageous in some cases, as where quick cutting material is being operated upon and thorough flushing of the kerf is required for assuring removal of the fines as rapidly as produced. In Figure 7 the slots 24 in disc 10 also extend to the cutting edge of the wheel. It will be noted that the inner portion of slot 24 is disposed at less inclination to the horizontal than the inner portion of slot 22 of Figure 6. The effect of centrifugal force in moving the liquid outward along slot 24 will be somewhat less than in slot 22 of Figure 6, assuming other conditions to be identical, which may be desirable in certain cases. It will be seen that by employing slots of different forms the rate of flow of the liquid coolant and lubricant outward of the slots may be controlled, to a certain extent, to suit various materials being cut. Further, by extending the slots through the cutting edge of the wheel rapid flushing of the kerf may be obtained, compared to wheels in which the slots are closed at their outer ends, which may be desirable in certain cases. In general, I prefer that the slots terminate a short distance inward from the cutting edge of the wheel, since with the slots so disposed the wheel is, in general, somewhat stronger and more rigid than the wheels in which the slots extend to and open through the cutting edge, though the latter arrangement is preferred in certain cases for the reasons stated. In either case, the outer ends of the slots are adjacent the cutting edge of the wheel, that term being here used as designating slots which open through the cutting edge as well as slots which terminate a slight distance inward of the wheel from the cutting edge thereof. While I have shown various forms of slots, by way of illustration, it will be understood that, within the broader concept of my invention, numerous other forms of slots not here shown may be used, as conditions may require.

I claim:

1. As a new article of manufacture, a cut-off wheel adapted to be driven about its axis in one direction and comprising a disc having a cutting periphery, said disc being provided with liquid receiving slots therethrough extending outward thereof toward and terminating adjacent its periphery, the lengthwise walls of the respective slots being normal to the plane of said disc, the respective slots comprising a substantially straight inner portion inclined outwards with respect to the axis of said disc in a direction away from the direction of drive of the wheel and a substantially straight outer portion inclined outwards with respect to the axis of said disc in a direction toward the direction of drive of said wheel.

2. As a new article of manufacture, a cut-off wheel comprising a disc having a cutting periphery, said disc being provided with liquid receiving slots therethrough extending outward thereof toward and terminating adjacent its periphery, the lengthwise walls of the respective slots being normal to the plane of said disc, the respective slots comprising an inner portion inclined with respect to the axis of said disc and an outer portion inclined to said inner portion.

3. As a new article of manufacture, a cut-off wheel comprising a disc having cutting elements at its periphery, said disc being provided with liquid receiving slots therethrough extending outward thereof toward and terminating adjacent its periphery, the lengthwise walls of the respective slots being normal to the plane of said disc, the respective slots comprising an inner portion inclined with respect to the axis of said disc and an outer portion inclined with respect to the axis of said disc and to said inner portion.

4. As a new article of manufacture, a cut-off wheel comprising a disc having cutting elements at its periphery, said disc being provided with liquid receiving slots therethrough extending outward thereof toward and terminating adjacent its periphery, the lengthwise walls of the respective slots being normal to the plane of said disc, the respective slots comprising an inner portion inclined with respect to the axis of said disc and an outer portion inclined oppositely to said inner portion with respect to the axis of said disc.

5. As a new article of manufacture, a cut-off wheel comprising a disc having a cutting periphery, said disc being provided with liquid receiving slots opening through its opposite faces extending outward thereof toward and opening through its periphery, the lengthwise walls of the respective slots being normal to the plane of said disc, said slots respectively comprising an inner portion inclined to the axis of said disc and an outer portion inclined to said inner portion.

6. As a new article of manufacture, a cut-off wheel comprising a disc having cutting elements at its periphery, said disc being provided with liquid receiving slots opening through its opposite faces extending outward thereof toward and opening through its periphery, the lengthwise walls of the respective slots being normal to the plane of said disc, said slots respectively comprising an inner portion substantially straight lengthwise and inclined to the axis of said disc and an outer portion substantially straight lengthwise and inclined oppositely to said inner portion.

7. As a new article of manufacture, a cut-off wheel comprising a disc having cutting elements at its periphery, said disc being provided in its radially outer portion with liquid receiving slots therethrough, the lengthwise walls of said slots being substantially normal to the plane of said disc, said slots respectively comprising an inner portion inclined to the axis of said disc and an outer portion inclined to said inner portion.

FRED M. BLEY.

REFERENCES CITED

The following references are of record in the file of this patent:

UNITED STATES PATENTS

| Number | Name | Date |
|---|---|---|
| 875,935 | Landis | Jan. 7, 1908 |
| 1,469,985 | Bath | Oct. 9, 1923 |
| 1,736,355 | Mosher | Nov. 19, 1929 |
| 2,047,649 | Robinson | July 14, 1936 |
| 2,351,433 | Jeppson et al. | June 13, 1944 |
| 2,352,888 | Dettloff | July 4, 1944 |

FOREIGN PATENTS

| Number | Country | Date |
|---|---|---|
| 444,531 | Germany | May 20, 1927 |
| 523,879 | Great Britain | July 24, 1940 |